(12) United States Patent
Lemay et al.

(10) Patent No.: US 9,954,950 B2
(45) Date of Patent: Apr. 24, 2018

(54) ATTESTABLE INFORMATION FLOW CONTROL IN COMPUTER SYSTEMS

(71) Applicant: Intel Corporation, Santa Clara, CA (US)

(72) Inventors: Michael Lemay, Hillsboro, OR (US); Scott Robinson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 14/757,733

(22) Filed: Dec. 23, 2015

(65) Prior Publication Data

US 2017/0185752 A1     Jun. 29, 2017

(51) Int. Cl.
*G06F 21/00*  (2013.01)
*H04L 29/08*  (2006.01)
*G06F 21/62*  (2013.01)

(52) U.S. Cl.
CPC ...... *H04L 67/1097* (2013.01); *G06F 21/6245* (2013.01)

(58) Field of Classification Search
CPC .......................... H04L 67/1097; G06F 21/6245
USPC .......................................................... 726/30
See application file for complete search history.

(56) References Cited

U.S. PATENT DOCUMENTS

| 9,009,468 | B1 | 4/2015 | Zayed | |
| 2011/0047287 | A1* | 2/2011 | Harrang | H04L 45/00 709/235 |
| 2014/0173752 | A1 | 6/2014 | Boelter et al. | |
| 2014/0208433 | A1 | 7/2014 | Mraz et al. | |
| 2014/0317686 | A1 | 10/2014 | Vetillard | |

FOREIGN PATENT DOCUMENTS

| WO | WO-2014077981 A1 | 5/2014 |
| WO | WO-2017112253 A1 | 6/2017 |

OTHER PUBLICATIONS

"International Application Serial No. PCT/US2016/063325, International Search Report dated Mar. 3, 2017", 3 pgs.
"International Application Serial No. PCT/US2016/063325, Written Opinion dated Mar. 3, 2017", 12 pgs.

* cited by examiner

*Primary Examiner* — Anthony Brown
(74) *Attorney, Agent, or Firm* — Schwegman Lundberg & Woessner, P.A.

(57) ABSTRACT

Solutions for controlling data exposure among computing entities are described. A data transfer agent (DTA) module includes a data payload portion to store information content conditionally transferable to at least one other DTA module, and a code portion containing instructions that operationally implement: a DTA connectivity link to the at least one other DTA module; an attestation module to obtain, via the DTA connectivity link, attestation from each of the at least one other DTA module indicating a data output connectivity configuration of that other DTA module; and a decision module to determine a degree of permissible interaction with each of the at least one other DTA module based the attestation and on decision criteria.

25 Claims, 10 Drawing Sheets

US 9,954,950 B2

ATTESTABLE INFORMATION FLOW CONTROL IN COMPUTER SYSTEMS

TECHNICAL FIELD

Embodiments described herein generally relate to information systems and related methodology and, more particularly, to a system architecture and operability for assuring proper handling of data to be transferred from one computing entity to another after the completion of the transfer.

BACKGROUND

The rise of distributed computing, such as cloud computing services, in recent years has invited computer users to send their data content to remotely-located servers or peer computers operated by third parties. Data content may be personal in nature, such as photos, videos, private or semi-private messaging, personally-identifying information, financial information, and the like. Although data content may be communicated securely from the user's computer system to a remote service, at present, users have little or no control over how their information, once received, will be handled—stored, processed, shared with others, etc., by the remote service. As such, users face the choice of either placing complete trust in the remote service, or forgoing the service entirely.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the following figures of the accompanying drawings.

DETAILED DESCRIPTION

Figure 1:
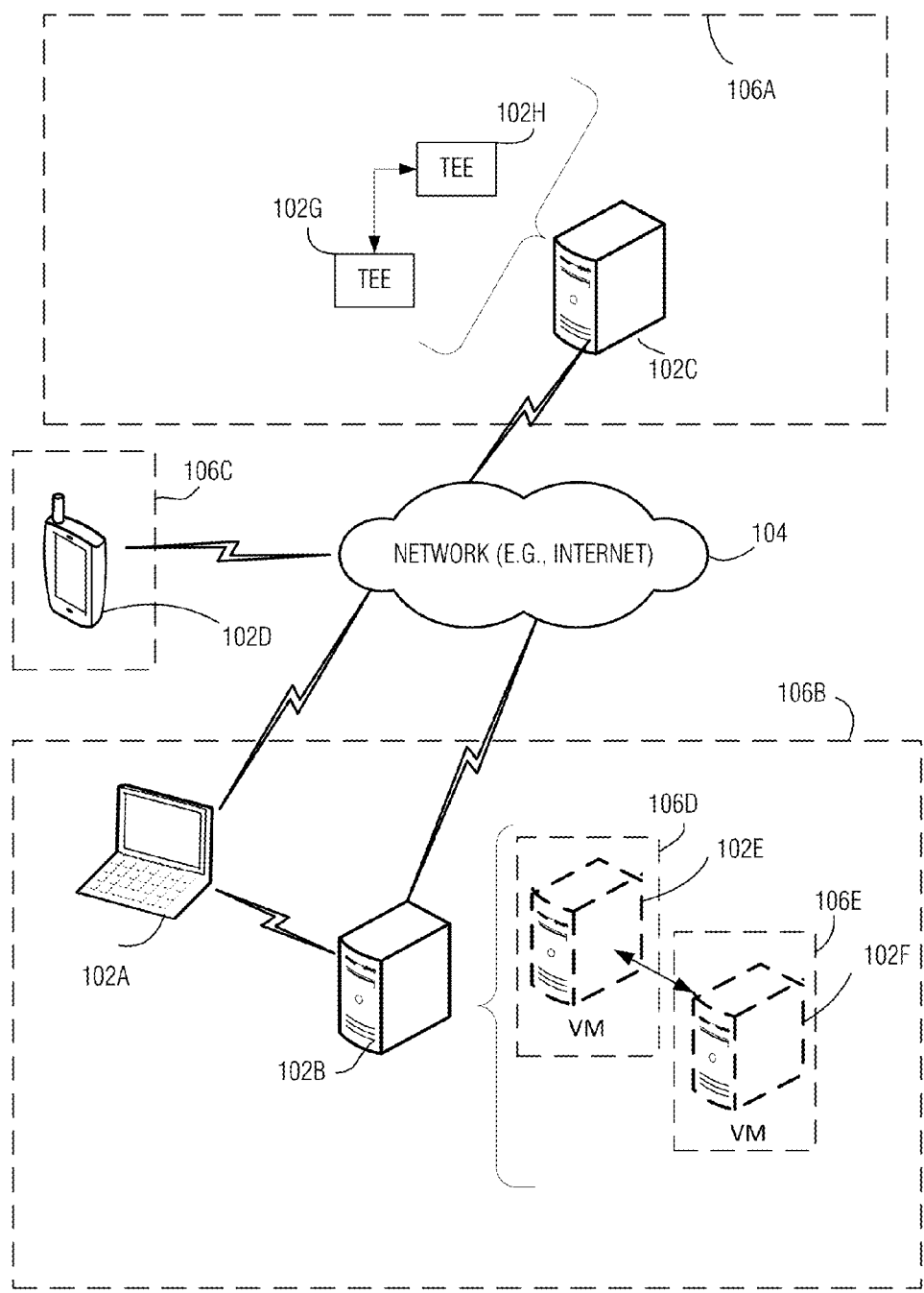
FIG. 1 is a high-level system diagram illustrating an example exchange of information between various types of computing entities as exemplary contexts in which embodiments of the invention may be applied.

FIG. 1 is a high-level system diagram illustrating an example exchange of information between various types of computing entities as exemplary contexts in which embodiments of the invention may be applied. As depicted, computing entities 102A-102F may take a variety of forms. Here, computing entity 102A, 102B, and 102C are personal computer systems. Computing entity 102D is a mobile device such as a smartphone, tablet, smart glasses or other wearable device, vehicle, or the like. Computing entities 102A-102D include computing hardware such as the exemplary hardware configuration described below, and may communicate with one another via computer network 104 such as the Internet, for instance. Although not depicted for the sake of clarity, each computing entity 102A-102D is coupled to network 104 via a corresponding service provider's infrastructure. Computing entities may also be hosted on computer systems, as exemplified by computing entities 102E-102H. Computing entities 102E and 102F are each a virtual machine (VM) hosted on computing entity 102B. Computing entities 102G and 102H are trusted execution environments (TEEs) hosted on computing entity 102C.

Computing entities 102A-102H may reside in different administrative domains 106A-106E. For instance, computing entities 102C and 102G-102H reside in administrative domain 106A, which may be a local area network (LAN) in which computer system 102C operates as a node. Computing entities 102A-102B and 102E-102F reside in administrative domain 106B, which may be a LAN in which computing entities 102A and 102B operate as nodes. Mobile device 102D resides in administrative domain 106C. As illustrated, there may also be administrative sub-domains 106D and 106E, which are recognized as distinct administrative domains within administrative domain 106B.

Information may be exchanged between computing entities within the same machine (e.g., between computing entities 102G and 102H, or between computing entities 102E and 102F), between computing entities within the same administrative domain (e.g., between computing entities 102A and 102B), and between computing entities across administrative domains, such as between computing entity 102C and 102D, for instance. Also, information may be exchanged between computing entities of different hierarchical type, such as between computing entities 102E and 102C, or between 102G and 102D, for instance. Conventionally, computing entities may lack control over the actions other computing entities, which is a cause for some challenges in terms of trusting the other computing entities to store and protect information transferred to them.

Systems and methods described herein are embodiments directed to Attestable Information Flow Control (AIFC), which defines a system architecture for controlling the flow of information between various computing entities, including computing entities on the same, or on different, administrative domains. In the various embodiments described below, computing entities may be virtual machines (VMs), Linux containers, Docker™ containers for use with systems built based on the Docker™ Open Source Project platform, and entire physical machines, among other types of computing entities.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer system). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, engines, or modules, which for the sake of consistency are termed modules, although it will be understood that these terms may be used interchangeably. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time.

In the AIFC according to some embodiments, the transfer of information from one computing entity to another is controlled, or limited, to some extent, by modules introduced herein as data transfer agents (DTAs). In various embodiments, DTAs may also be employed to perform privacy-preserving computations in trusted execution environments (TEEs), such as sandboxes, auxiliary processor(s), emulators, and the like. When instantiated on a computing entity, a DTA forms a module according to embodiments.

According to various embodiments, DTAs may be implemented in a variety of ways. For example, they may be virtual machines, SGX enclaves or portions thereof, Linux containers, processes, or even entire interconnected baremetal machines.

Figure 2:
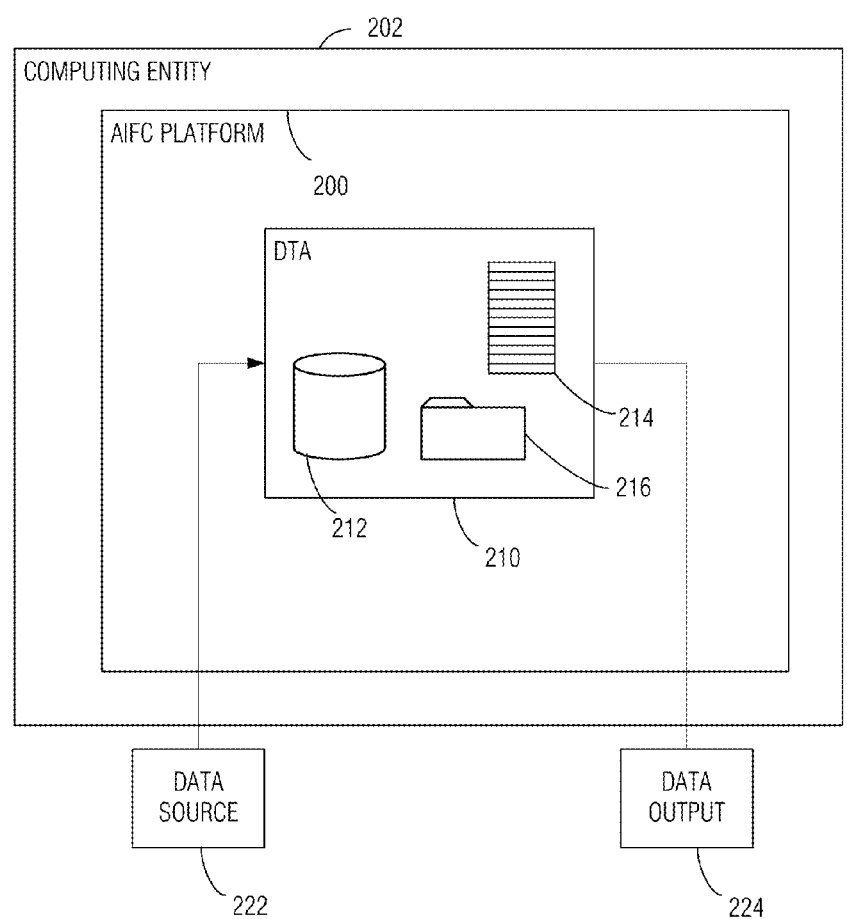
FIG. 2 is a block diagram illustrating an Attestable Information Flow Control (AIFC) platform and a Data Transfer Agent (DTA) according to some embodiments.

FIG. 2 is a block diagram illustrating an AIFC platform and a DTA according to some embodiments. AIFC platform 200 is executed by computing entity 202, which in this diagram is representative of any of computing entities 102A-102H. When AIFC platform 200 is executed on the corresponding hardware, it forms a module. In some embodiments, AIFC platform 200, when executed, provides an execution environment, including dynamic and runtime libraries, application programming interfaces (APIs), etc., with which DTAs are created, transferred, and executed, and which ensures trusted behavior for DTAs. AIFC platform 200, in some embodiments, may reside in an operating system (OS), a process virtual machine, a system virtual machine, a virtual machine monitor (VMM) or hypervisor, or a Docker™ platform, for instance.

In some embodiments, because instances of AIFC platform 200 reside on each computing entity, AIFC platform 200 may be regarded as a distributed fabric that permeates the computing entities. In other embodiments, AIFC platform 200 may be implemented in varying ways on different computing entities, in which case there may be a standardized communication protocol by which DTAs are exchanged. In related embodiments, there may be a translation module in each AIFC platform 200 that converts DTAs to a format that is locally executable by the present AIFC platform 200.

In some embodiments, DTA 210 includes data payload 212, code 214, and properties 216. Data payload 212 contains information that is subject to being transferred between computing entities. Code 214 contains instructions that, when executed, perform operations to assure proper handling of the information in data payload 212 by one or more computing entities to which the information of data payload 212 is to be transferred. Properties 216 contain DTA-specific data that uniquely identify DTA 210 and define the policy or policies to be carried out by execution of DTA 210.

As depicted, DTA 210 may gather, receive, or otherwise obtain, data from data source 222, to be associated with DTA 210 as data payload 212. According to various embodiments, data source 222 may be any data-generating device or process, such as an output from an executing application, data from a data capture device such as a camera, microphone, biometric sensor, position or orientation sensor, accelerometer, temperature or pressure sensor, or the like. DTA 210 may also provide an output based on the content of data payload 212, and execution of code 214, to data output destination 224. According to various embodiments, data output destination 224 may be an output device such as a monitor, sound-producing transducer, network interface device (NID), data storage device such as system memory or disk, or an executing process. In a related embodiment, DTA 210 may constitute a data encapsulation object that includes a data structure for storing and protecting data payload 212, and which is transmitted to a destination computing entity as a holder of the data to be transferred.

According to some embodiments, a computing entity such as one or more of computing entities 102A-102H uses one or more DTAs, such as DTA 210, to protect the data to be transferred to another computing entity. Among its various functions, which are detailed below, the data-transferring DTA protects the data by interrogating potential-recipient DTAs in specific ways and using the results of those interrogations to decide which data to entrust to the potential-recipient DTAs. Attestations are used to verify the computational capabilities and security properties of these other service DTAs. This supports a variety of useful access control policies.

Advantageously, some embodiments allow users to obtain value from TXT-, VT/TPM- and SGX-based remote attestation by providing application programming interfaces (APIs) for structuring computations in a way that protects user data.

In various embodiments, AIFC platform 200 permits, and supports, individual DTAs to:

(1) receive communications from a defined set of other DTAs and input data sources;
(2) store data payloads securely such that they are inaccessible to other DTAs or other processes unless access is specifically granted;
(3) communicate with a defined set of other DTAs and output interfaces (in related embodiments, this set may be frozen to support attestations to the effect of a particular DTA only being able to send secrets over known output channels for a given transaction or set of transactions, for example);
(4) interrogate neighboring DTAs about their identity (which in some embodiments includes information based on code contents) and properties (e.g., protection capabilities, connectivity, etc.) and verify those identities/properties via attestations; and
(5) limit their operability to only those platforms that meet certain minimum security requirements.

Figure 3:
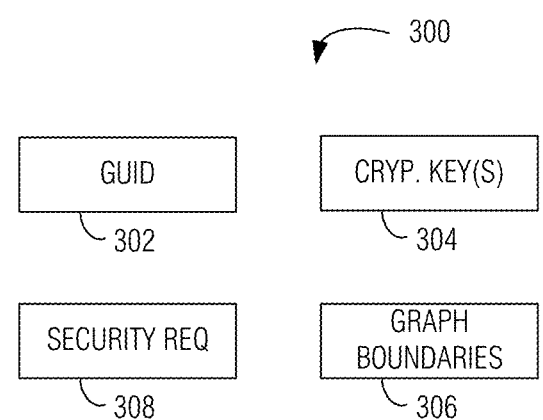
FIG. 3 is a block diagram illustrating various parameters that define certain properties of a DTA according to some embodiments.

FIG. 3 is a block diagram illustrating various parameters that define certain properties of a DTA according to some embodiments. Parameters 300 may be items of data stored in association with DTA 210. Collectively, parameters 300 may constitute some or all of properties 216.

Global unique identification (GUID) 302 uniquely identifies its corresponding DTA 210. In some embodiments, GUID 302 is based on a hash of a stored image of DTA 210, combined with an identification of the host computing entity 202, and a timestamp value representing a time when the image of DTA 210 was created. In related embodiments, some subset of this combination constitutes GUID 302.

Cryptographic key(s) 304 is a parameter that contains the value(s) of one or more cryptographic keys, such as a symmetric key, or a public key infrastructure (PKI) key pair, which may be used to obfuscate the contents of data payload 212, for instance.

Graph boundaries 306 define limits on links that data-recipient DTAs may have or establish with input devices, output devices, or other DTAs, in order for DTA 210 to permit the passing of data payload 212 contents to the data-recipient DTA. Notably, the data-recipient DTAs may be adjacent to DTA 210—meaning that DTA 210 exchanges information directly with them; or data-recipient DTAs may be multiple hops from DTA 210—meaning that information is relayed by an intermediate one or more other recipient DTAs. Graph boundaries 308 may include the GUID information (e.g., including information upon which GUIDs are generated) of trusted DTAs having code that is deemed suitable for receiving the contents of data payload 212.

Security requirements 308 include a set of minimum security requirements that must be met on a destination computing entity for DTA 210 to be substantiated at that computing entity. In the present context, substantiation means qualified instantiation of a DTA, such as instantiation upon a determination that security requirements 308 are satisfied at the destination computing entity. DTA substantiation ensures proper protections are installed and that attestations about that DTA may be made.

In some embodiments, each DTA has a distinct point in time at which it is substantiated from a DTA image. Substantiation involves verifying that the computing entity that hosts the recipient DTA is capable of delivering the required security requirements 308 that DTA 210 mandates before it may be instantiated, and then instantiating the DTA 210 on that recipient system with the desired configuration. During the instantiation process, information about the DTA such as a hash of its code will be retained by AIFC platform 200 to support future attestation exchanges.

Figure 4:
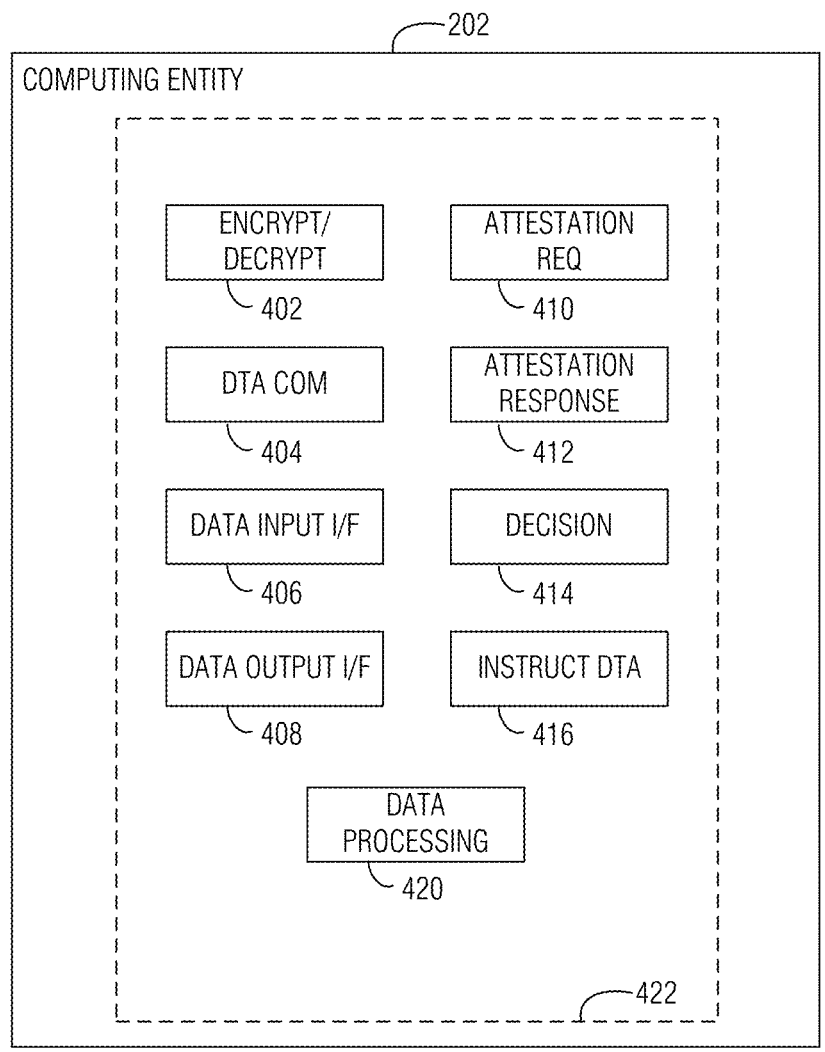
FIG. 4 is a block diagram illustrating an exemplary set of modules that may be formed when a DTA is substantiated according to some embodiments.

FIG. 4 is a block diagram illustrating an exemplary set of modules that may be formed when a DTA is substantiated according to some embodiments. These modules may be regarded as a subset of computing entity 202, which in some embodiments may itself be a module of a host computer system. In some embodiments, each of the modules depicted in FIG. 4 and described below may be formed by execution of instructions 214 of DTA 210, along with execution of AIFC platform 200, as well as other program instructions, such as those that make up an OS.

Encrypt/decrypt module 402 is programmed, or otherwise configured, to perform cryptographic operations to selectively obfuscate, or clear, contents of data payload 212. DTA communication module 404 is programmed, or otherwise configured, to coordinate the passing of information to and from other DTAs. Data input interface module 406 is programmed, or otherwise configured, to receive information from a data source, such as data source 222. Data output interface module 408 is programmed, or otherwise configured, to output data to a data output device, such as data output 224.

Attestation request module 410 is programmed, or otherwise configured, to interrogate a prospective connected DTA in order to obtain attestation(s) as to the limits of that DTA's connectivity, output capabilities, and general operability, from which a decision may be made as to the passing of information from data payload 212, for example. Attestation response module 412 is programmed, or otherwise configured, to respond to attestation requests from other DTAs to provide attestation(s) pertaining to the connectivity, output, and other general operability limits of DTA 210.

Decision module 414 is programmed, or otherwise configured, to determine, based on attestation(s) received from other DTAs, a degree of permissible interaction with each DTA. In various embodiments, the degree of permissible interaction may include a binary degree, such as whether or not to interact with each other DTA. An example of a permissible interaction is whether or not to expose data payload 212 to those DTAs. The degree of interaction may also include multiple levels or classes of permissible interaction, such as permission to expose some data, but not other data, to the other DTAs, or certain variable conditions for exposing data to other DTAs. Decision module 414 is configured to apply decision criteria that may be defined at least in part by graph boundaries properties 306.

DTA instruction module 416 is programmed, or otherwise configured, to send instructions to other DTAs to perform certain operations or establish certain connections to other DTAs, in order to carry out an operational objective defined for DTA 210.

Data processing module 420 is programmed, or otherwise configured, to perform one or more operations on the information obtained from an input device or from another DTA. The output of the data processing may be stored in data payload 212, encrypted via encryption/decryption module 402, output to another DTA via DTA communication module 404, or output to an output device via data output interface module 408.

In some embodiments, both, DTA images, as well as instantiated DTAs, are isolated from other processes or computing entities that may attempt to probe their internal state or contents. Isolation module 422, implements this isolation according to the embodiment depicted. Isolation module 422 allows DTA 210 to prevent release of any information without first making an affirmative decision to release any information about its data payload 212 or internal state.

In other embodiments, only a subset of internal state or contents of a DTA is isolated from other processes or computing entities. This isolation may be temporal in nature, such that contents or internal state of a DTA is isolated at certain times (e.g. when the DTA is active following its instantiation, but not while DTA is stored as an image).

Figure 5:
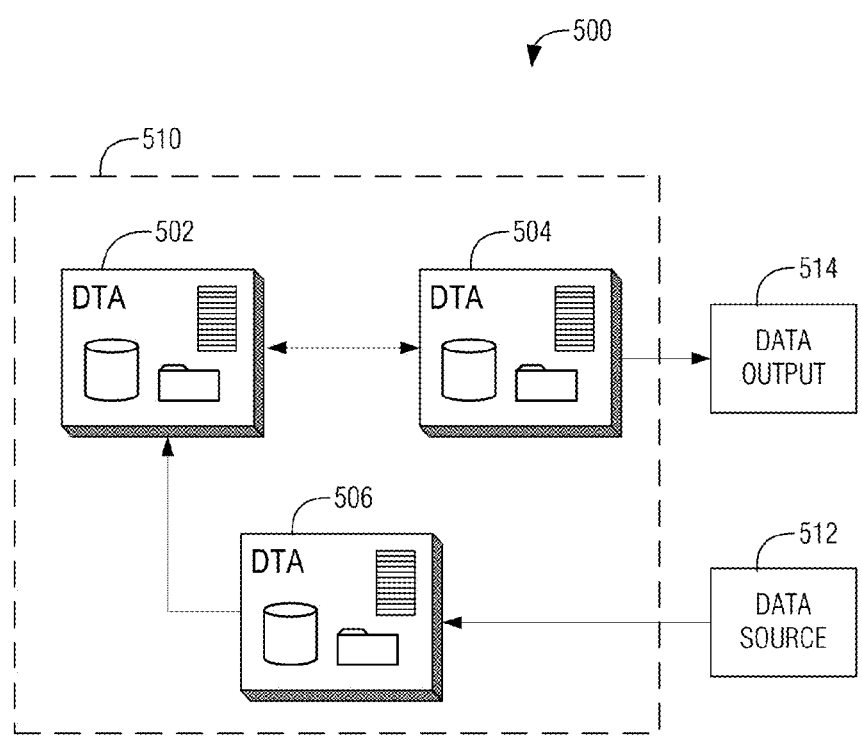
FIG. 5 is a block diagram illustrating a directed graph of DTAs according to some embodiments.

By operation of respective DTA communication module 404, attestation request module 410, decision module 414, and DTA instruction module 416, DTA 210 may form a directed graph with other DTAs. FIG. 5 is a block diagram illustrating a directed graph of DTAs according to some embodiments. As depicted, directed graph 500 defines bi-directional data flow between DTA 502 and DTA 504, and unidirectional data flow from DTA 506 to DTA 502. In this example depicted, the data flows between DTAs 502-506 are entirely within distributed AIFC fabric 510, which may be composed of multiple instances of an AIFC platform running on different computing entities in some cases. Directed graph 500 also includes unidirectional communications from entities outside of AIFC fabric 510, namely, data source 512, and data output device 514.

In some embodiments, communications along a link are unobservable to any entities other than the sender and recipient, although the presence of the link may be visible. For example, this may be implemented using encrypted socket-based connections between DTAs. In such an embodiment, each DTA is able to determine the identities of its neighbors. This may be facilitated by the use of GUIDs, as discussed above.

In some embodiments, each DTA may specify minimum security requirements for the platforms on which it may be instantiated and used. For example, a DTA image may specify that a specific return-oriented programming (ROP) mitigation mechanism is in use to defend against ROP-based exploits.

In some embodiments, at the a DTA is substantiated, it may create outgoing links to existing DTAs. In a related embodiment, a network of DTAs that are all simultaneously substantiated may create bidirectional links to each other.

In some embodiments, if an existing DTA requests substantiation of other DTAs, outgoing links may be created to the existing DTA requesting the substantiation, or other DTAs to which the requesting DTA already has outgoing links, if the requesting DTA provides references to those DTAs. In a related embodiment, if an external entity is substantiating a new network of DTAs, then those DTAs may construct outgoing links to existing DTAs to which references are provided by the requesting external entity.

In some embodiments, AIFC fabric 510 prevents new outgoing links from being created from a DTA after it has finished initialization. This limitation allows other DTAs that request attestation as to the connectivity of that DTA to be able to fully characterize the possible information flows from the DTA from which attestation is being sought. This includes links to output devices 514, such as displays or other actuators, data stores, such as file systems, or the like.

According to some embodiments, DTAs may accurately determine all outgoing links from their neighbors to which they may send data. This operability enables a DTA to determine how its neighbors may communicate private data provided to them, since existing DTAs are unable to create any new outgoing links.

Figure 6:
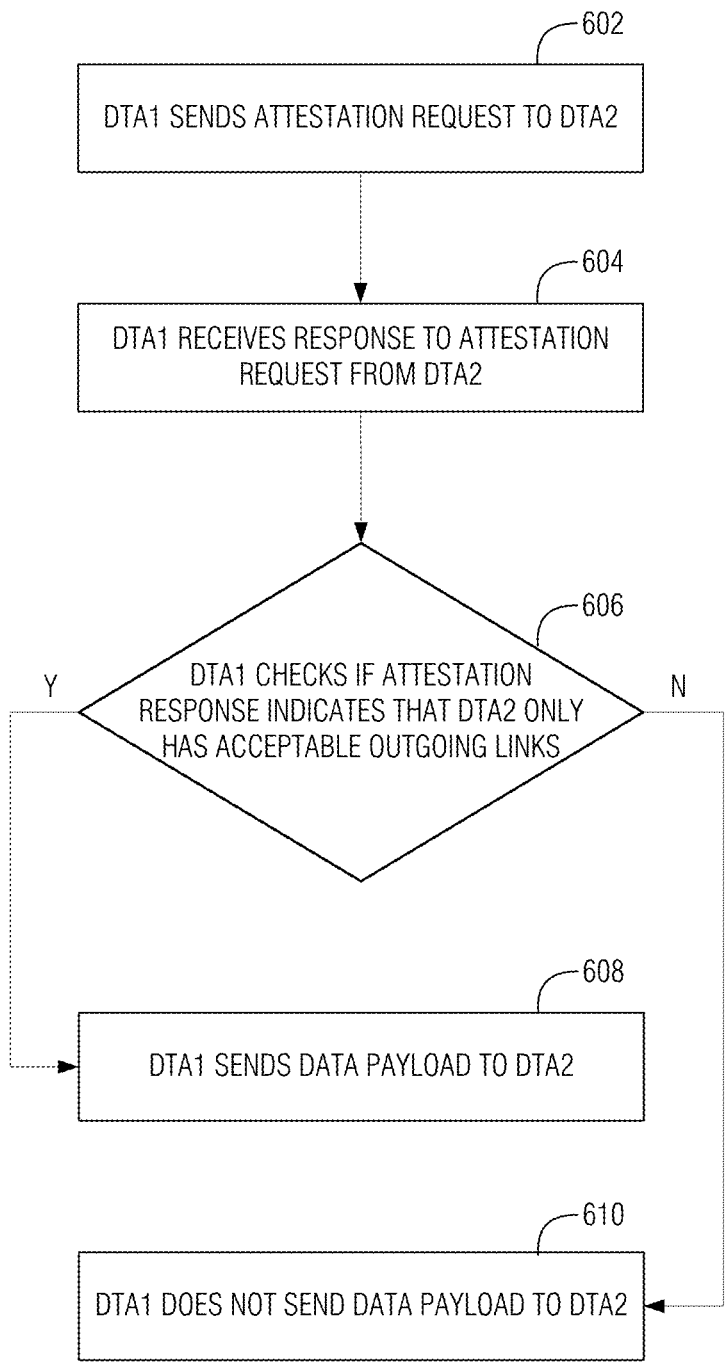
FIG. 6 is a flow diagram illustrating an exemplary attestation process according to some embodiments.

FIG. 6 is a flow diagram illustrating an exemplary attestation process according to some embodiments. At 602, a first DTA sends an attestation request to a second DTA. The purpose of the attestation request may be to obtain a listing of outgoing links of the second DTA. At 604, the second DTA responds to the attestation request, and the first DTA receives that response. At 606, the first DTA compares the content of the attestation request response against a set of decision criteria. If the attestation response, based on the decision criteria, indicates that the second DTA only has outgoing links that are deemed acceptable, then at 608 the first DTA sends it data payload to the second DTA. In the opposite case, as indicated at 610, if the attestation returns a fact that the second DTA has at least one outgoing link that is not among the acceptable outgoing links according to the decision criteria, the first DTA forgoes sending its data payload to the second DTA.

In a related embodiment, a DTA may proxy an attestation request to one of the DTAs connected to its outgoing links, and the response is constructed such that it may then be verified by the requestor. For example, the attestation protocol may be handled by an AIFC platform or fabric that communicates directly with each DTA and prevents forgery or replay of attestation responses.

In some embodiments, a DTA may permanently renounce any of its links at any time.

In some embodiments, a DTA has the option of accepting or refusing incoming links.

In some embodiments, a DTA may produce a DTA image and transmit it along any of its outgoing links to other DTAs. It may also output (e.g., distribute, or publish) it if it has a compatible output link (e.g. an Ethernet connection). That DTA image may subsequently be substantiated at a destination computing entity.

In some embodiments, each DTA may exhibit unique behavior. In a related embodiment, the AIFC platform prevents a DTA's content from being directly inspected by any other DTA; however, it is possible that an external oracle process may produce information indicating how a specifically-identified DTA will behave. For example, this may be accomplished by inspecting a hash during a remote attestation procedure to determine whether the attested code is trusted in some way (e.g. to function in a particular manner, to only extract certain types of data from its inputs, etc.).

In some embodiments, at the time of its substantiation, a DTA may produce outputs that may be perceived by designated entities. For example, entities may be associated with specific physical sensors or externally-connected network interfaces and connections on the host machine. That choice is represented in attestation messages, so that communicating entities know that it is possible for information provided to that DTA to be outputted.

In some embodiments, a DTA connectivity graph may be fixed, such that changes cannot be made to the links between DTAs. Connectivity between DTAs may include certain functionality within AIFC platform 200, such as non-volatile file storage. The lifetime of DTA state may be ephemeral and linked to the DTA graph. This regime provides assurances to the data-sourcing DTA that copies of data will not be made.

Figure 7:
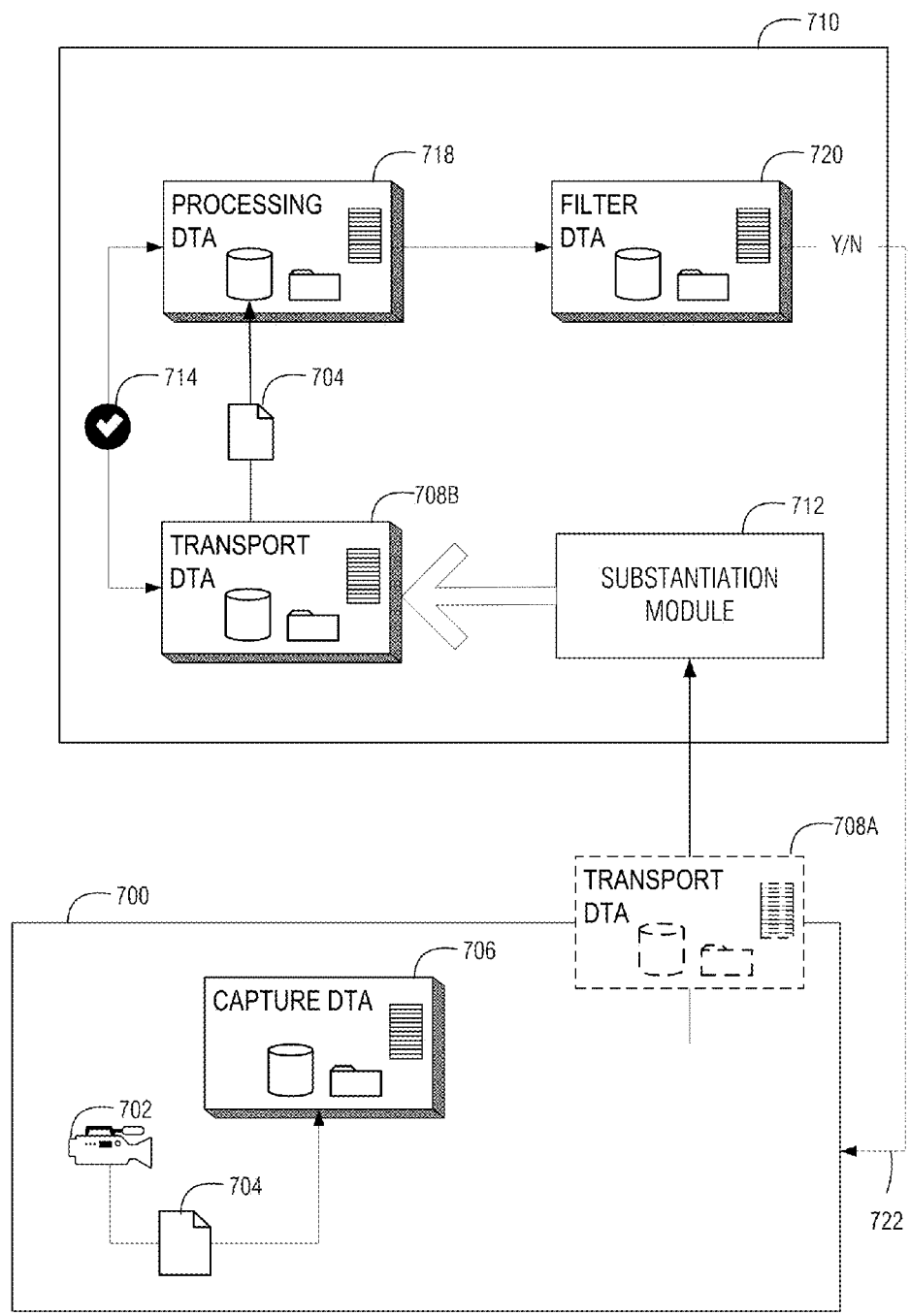
FIG. 7 is a functional block diagram illustrating an example of the operation of an AIFC fabric and an interconnected set of DTAs according to some embodiments.

FIG. 7 is a functional block diagram illustrating an example of the operation of an AIFC fabric and an interconnected set of DTAs according to some embodiments. In this example, information is transferred from a first AIFC platform 700 of a first computing entity to a second AIFC platform 710 of a second computing entity using some of the principles of operation of DTAs described above. The following description is presented in the context of transferring captured video data, such as surveillance video segments, generated by security camera 702, for instance, to a remote, cloud-based, service hosted by a computing entity that is tasked with processing the video segments in order to detect motion therein. AIFC platforms 700 and 710, as well as the DTAs operational therein, work together to provide assurance to the owner of the captured video data that the use of the video data by the cloud service will be limited to producing an indication of motion detection state.

Surveillance camera 702 generates video segment data 704. Data capture DTA 706 is interfaced with the output of surveillance camera 702 to capture the output thereof. As the output of its operation, data capture DTA 706 generates an image 708A of a data transport DTA, the data payload of which contains an encrypted copy of video segment data 704, and sends image 708A to the cloud service, in which substantiation module 712 receives image 708A.

Image 708A includes substantiation-related properties that may set conditions which must be met before the transport DTA may be instantiated, as well as properties and code that, when executed, define connections to be made to downstream DTAs, and an attestation review process to ensure that the proper information-handling safeguards are in place in computing entity 710.

Image 708A of the transport DTA is passed to substantiation module 712. Substantiation module 712 examines the substantiation-related properties, such as security requirements, indicated in image 708A and, if the criteria is met by second AIFC platform 710, substantiation module 712 instantiates transport DTA 708B in second AIFC platform 710. As described above, instantiation of a DTA involves executing the code contained in the DTA. The code of transport DTA 708B is includes instructions for conditionally passing the data payload contents of transport DTA 708B, particularly video segment data 704, to data processing DTA 718.

The instructions for conditionally passing the data payload contents of transport DTA 708B, when executed, carry out an attestation request, and a decision based on review of the response to the attestation request against decision criteria. Accordingly, transport DTA 708B initiates attestation process 714. Part of the attestation request involves requesting an identification of all outputs of data processing DTA 718. In the present example, the attestation response by data processing DTA 718 includes an indication that filter DTA 720 is the sole output of data processing DTA 718. Filter DTA 720 is configured to perform the function of ensuring that the output of data processing DTA 718 is limited to a motion detection state indication (e.g., an indication of Yes or No). Filter DTA 720 operates to trap any output from data processing DTA 718 that is not the binary Yes/No state indication. This arrangement of DTAs prevents any of the video segment data 704 from being leaked to any object, process, or entity outside of the transport DTA 708B-data processing DTA 718-filter DTA 720 set in second AIFC platform 710. Therefore, the attestation conditions of transport DTA 708B are met.

In a related embodiment, attestation response by data processing DTA 718 includes a freezing, or locking down, of the connections of data processing DTA 718. This operation ensures that the attestation result remains valid while data processing DTA remains active in second AIFC platform 710.

In another related embodiment, if the properties of transport DTA 708B request the output of processing DTA to be limited to filter DTA 720, and if it happens that at the time of the attestation request data processing DTA 718 is not connected with filter DTA 720, the instructions of transport DTA 708B may command processing DTA 718 to connect with an extant filter DTA 720 or, if no filter DTA 720 exists, to substantiate or instantiate filter DTA 720 and connect with it, and set up filter DTA 720 to deliver its output to an appropriate point, such as a socket.

In response to the successful attestation, transport DTA 708B decrypts, and passes the clear video segment data 704 to data processing DTA 718. Data processing DTA 718 obtains the video segment data 704, stores that data in its own data payload, and uses its code to perform motion detection analysis of the video segment data. The result of the analysis is sent to filter DTA 720, which ensures the binary output is so limited, and proceeds to transmit the binary output back to computing entity 700 in communication 722.

In the case of continuously-streaming video output from capture device 702, the operations described above are repeated for each subsequent video sequence 704.

In a related embodiment, communication 722 may involve the generation of a transport DTA for communicating the motion detection result, though in the case depicted this level of protection is deemed unnecessary since the binary (yes/no) output does not expose any of the sensitive content present in video segment data 704.

The methodologies executed by the operations of the AIFC fabric ensure that the data output configuration of the cloud-based data processing service remain stable, as attested. This output configuration stability is maintained even if the underlying motion detection algorithm is updated by a third party. Even if an update accidentally or deliberately changes the instructions of the motion detection algorithm to transmit video sequence data 704 to an outside entity, the fixing of the output of data processing DTA 718 to filter DTA 720 prevents unauthorized data leakage. This assurance may lead to greater innovation in the core processing algorithms within a system with less risk of policy violations.

In related embodiments, a subset or all of the existing DTAs may be permitted to establish new links to other existing DTAs for some period of time. This may be administered according to some security policies.

In related embodiments, the inverse of restrictions that are imposed on link creation to enforce confidentiality policies may be imposed on link creation to enforce integrity policies. For example, a DTA may only accept data from another DTA that is accepting inputs from a defined set of other DTAs or input devices. The motivation for such a policy may be that the output from the receiving DTA is used for a mission-critical purpose. Thus, it may be important that the data feeding into that mission-critical computation be of high quality and from trustworthy sources. This may be enforced by preventing existing DTAs from accepting new incoming links from other DTAs. Thus, a DTA that has an incoming link from a second DTA may use attestation in order to completely enumerate the data sources that are feeding into the second DTA, with assurance that no possibility of additional data sources being added to the second DTA after the attestation was performed.

In related embodiments, rather than only relying on individual DTAs performing attestation operations to decide whether and how to release and/or accept data, a centralized decision function may be a part of the computing entity that contains a collection of DTAs. That decision function may take information about the entire graph of DTAs as input when making decisions. The decisions may take various forms, such as whether or not to permit the execution of one or more of the DTAs to proceed, whether to transmit data along certain links, and whether to add DTAs and links. The decision function may also transmit auxiliary data into DTAs to affect their execution. DTAs may have an associated policy that only permits them to execute in computing entities with acceptable centralized decision functions or that prohibits them from executing in computing entities with centralized decision functions.

In related embodiments, a DTA is configured to make various other decisions to protect its data payload. For example, a transport DTA containing sensitive information in its data payload may include code that, when executed, checks the identity of a potential data-recipient DTA (e.g., a processing DTA) to verify that the potential-recipient DTA is trusted. Release of the data payload to the recipient-DTA is conditioned upon the trust status check result.

In another embodiment, the transport DTA is configured with code that, when executed, alters the data in its data payload upon release of the data to the recipient DTA based on the identity of the recipient DTA. For example, a data-processing DTA may be identified in a DTA trust status table (e.g., stored as part of the transport DTA's properties) as a having a high trust status, in which case the decision module of the transport DTA may permit clear data from the data payload to be released to that trusted data-processing DTA. On the other hand, in cases where the data-processing DTA is not indicated as being trusted by the transport DTA, the decision module of the transport DTA may use the code of the transport DTA to remove certain portions of the data (e.g., the background imagery from a photo) prior to releasing the data to the data-processing DTA, for example.

Figure 8:
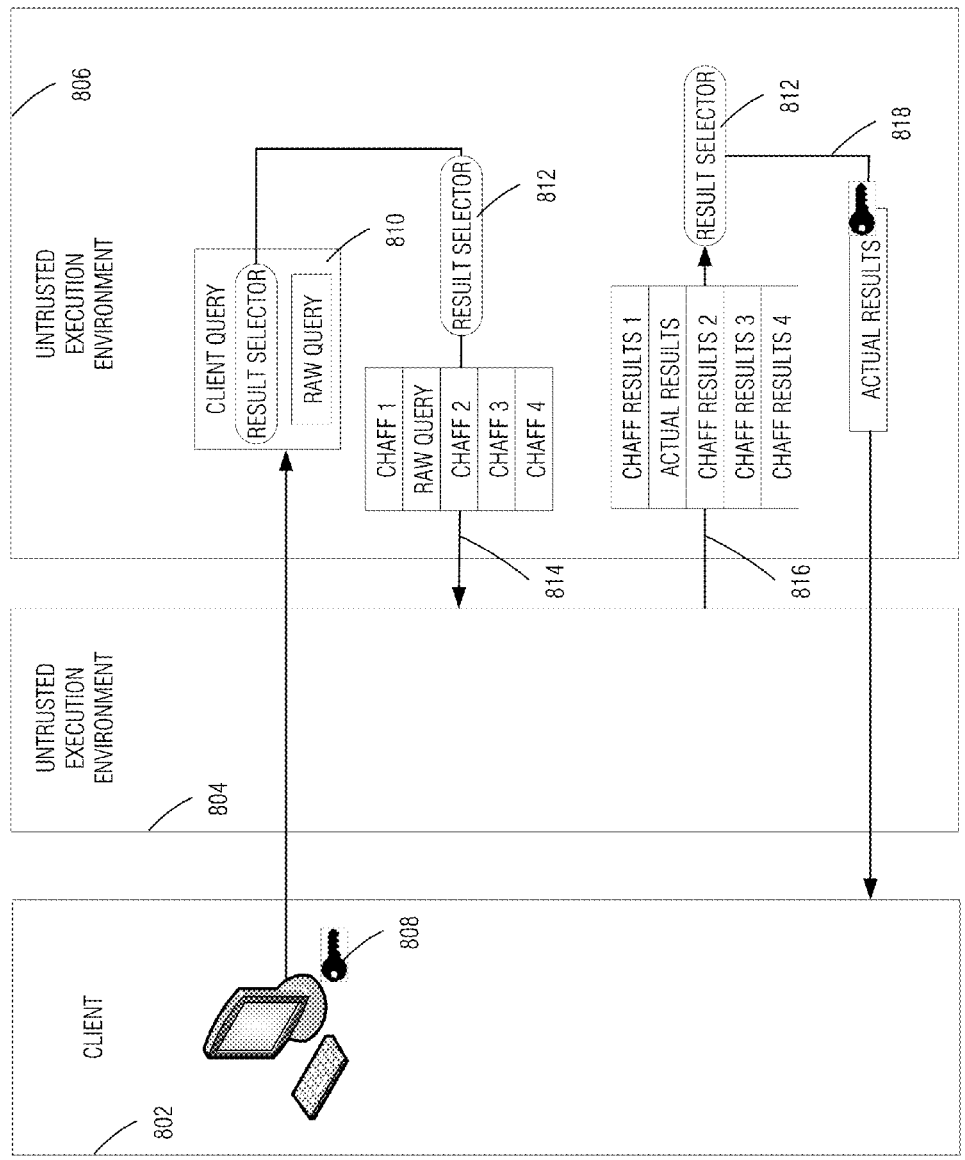
FIG. 8 is a data flow diagram illustrating an example operation of an AIFC platform in the case where sensitive data is to be presented outside of a trusted execution environment for DTAs according to some embodiments.

FIG. 8 is a data flow diagram illustrating an example operation of an AIFC platform in the case where sensitive data is to be presented outside of a trusted execution environment for DTAs according to some embodiments. According to the example case depicted, client 802 wishes to direct a query containing sensitive information to untrusted execution environment 804. According to some embodiments, trusted execution environment 806, which may be implemented by an AIFC platform, is employed to establish a secure pipeline, the purpose of which is to obfuscate the client's actual query of interest (e.g., a search engine query) by introducing a relatively large amount (compared to the actual query) of decoy query information, referred to as chaff. Trusted execution environment 806 in this example may execute an AIFC platform, and operate as a proxy for the client to access untrusted execution environment 804. As indicated at 808, the client's actual query is encrypted and sent to trusted execution environment 806, which forms client query DTA 810. Client query 810 includes the raw query itself, along with a result selector module that generates, and later filters, the chaff. Result selector 812 operates in trusted execution environment 806 to generate a large amount of chaff, and submit the raw query, along with the chaff, to the untrusted execution environment as a query, as indicated at 814. In a related embodiment, the chaff is generated to have an informational entropy similar to that of the raw query to further frustrate any attempt to distinguish the raw query from the chaff.

At 816, result selector module 812 receives search results for the raw query (e.g., the Actual Results) along with query results for the chaff, and operates to separate the actual results by filtering out, or disregarding the chaff results. At 818, result selector 812 encrypts the actual query results, and transmits them to client 802.

In various embodiments, DTAs and the links between them may be implemented in a variety of ways using hardware and software security technologies to resist attacks from specific types of adversaries.

DTA images may be implemented as code and data encrypted in such a way that it may only be decrypted in an environment that will properly instantiate a DTA from the DTA image. In an example embodiment, a service is entrusted with the ability to provide the keys necessary to decrypt a DTA image, such as by unwrapping a key that accompanies the DTA image and is encrypted using the decryption service's public key. That service may be trusted to verify (e.g. using attestation) that the host requesting access to a DTA image conforms to the policy that is bound to the DTA image.

Docker™-Specific Examples

In some embodiments, specific enhancements may be made to Docker™, a popular container runtime environment, that may implement a close approximation of the abstract design discussed above. One type of approach utilizes principles of capability-based systems. Capability-based systems differ from others in that each access permission within the system is represented as a token (referred to as a "capability") that serves as evidence to the policy enforcement mechanism that the capability's bearer has been granted the permission specified in the capability. For example, this is in contrast to many other types of access control regimes that associate Access Control Lists (ACLs) with the objects to which access is being controlled, in which those ACLs specify the subjects/principals that are allowed access to the associated objects. One advantage of capability-based systems in systems that seek to sandbox principals is that it is relatively straightforward to enumerate all capabilities associated with each principal (container) to determine that its actions are appropriately constrained. In an ACL-based system, it may be necessary in the worst case to examine all ACLs to determine what permissions have been granted to each principal.

Docker™ provides a remote API for managing containers. Aspects of these embodiments are directed to extending that API to support the AIFC policy framework. Docker™ may also be enhanced to make a specific subset of the existing API available from within containers themselves:

(1) create: AIFC DTA containers need the ability to launch new DTA containers.

(2) (id)/json: AIFC DTA containers need the ability to query properties of other DTAs.

The create command may be extended to return to the invoker a capability that allows the addition of capabilities to the new DTA container. Each new DTA container starts with just a minimal set of capabilities allocated to it, as described below in the listing of capability types, so ally desired capabilities may initially be added to it by its creator.

A few new commands are defined and made available from within DTA containers to manipulate capabilities:

(1) cap/(cap-id)/send (dent-id): Transfer a capability identified by (cap-id) from the invoking DTA container to the DTA container specified by (dest-id). Also send SIGUSR2 to the main process in the destination DTA container to notify it that a new capability is available. None of these steps will be performed if the destination DTA container has frozen its set of capabilities, as described next.

(2) cap/freeze: Prevent any additional capabilities from being transferred to the invoking DTA container. Also prevent the invoking DTA container from renouncing any of its capabilities or opening or deleting message queues, to prevent the construction of a covert channel by influencing the results of the (id)/json command as described below.

(3) cap/(cap-id)/renounce: Renounce the capability identified by (cap-id) from the invoking DTA container.

(4) (cont-id)/cap/(cap-id)/json: Return a description of the selected capability possessed by the DTA container identified by (cont-id). The information should be sufficient to support the sorts of decisions described previously, such as checking all outgoing links from a DTA container prior to transferring private data to it.

Commands may also be defined for managing links between DTA containers:

(1) mq/create: Create an outgoing POSIX message queue that may send messages from the invoker to some other DTA container. Return a local filesystem path that the invoker may use to reference the new queue, and a capability that the invoker may transfer to the intended recipient for the queue.

(2) mq/delete (mq-path): Delete the specified outgoing POSIX message queue.

(3) (cont-id)/mq/open: Open a message queue to receive messages from the selected sending DTA container. A capability for this must have previously been transferred to the invoker by the selected sending DTA container. Return a local filesystem path that the invoker can use to reference the queue.

The (id)/json command may be extended to provide much more information about DTA containers to support AIFC access control decisions:

(1) List the handles, directions, and endpoints of all message queues accessible from the DTA container.

(2) List the IDs of all capabilities allocated to the DTA container.

(3) List the ordered sequence of hashes of the DTA container images used to construct the DTA container. This may be used to determine whether a DTA container is in a known, trusted configuration.

The DTA container identified by (id) can influence the information returned by (id)/json prior to freezing its capabilities, e.g. by substantiating a new DTA container and thus obtaining new capabilities as described earlier. This could result in the construction of a covert channel to other DTA containers that invoke (id)/json. Thus, when other DTA containers make decisions about whether to release information to another DTA container, the sending DTA container may take into account the possibility that a receiving DTA container with unfrozen capabilities may be able to communicate over such a covert channel to unknown recipients. In one approach, the (id)/json command does not return information that can be influenced by the DTA container being queried after that container has frozen its capabilities, to prevent the construction of a covert channel.

The following types of capabilities are defined to control the ability of each DTA container to invoke the applicable APIs:

(1) query-DTA container (cont-id): Used to perform the (cont-id)/json or (cont-id)/cap/(*)/json call. Implicitly granted to each DTA container upon creation to allow it to query itself.

(2) send-cap (dest-id): Required to perform the cap/(*)/send (dest-id) call. Implicitly granted to each DTA container upon creation so that it can be sent to other DTA containers to allow them to send it capabilities.

(3) mq-receive-from (cont-id): Used to perform the (cont-id)/mq/open call.

(4) sockets: Used to use sockets APIs to establish arbitrary network connections. Implicitly granted to DTA containers launched from external sources (not by other DTA containers).

To illustrate how these simple calls and capabilities may be orchestrated to implement a powerful policy, consider the following sequence of actions for implementing the policy of our running example:

(1) Video camera submits Video Segment DTA container Image to algorithm provider.

(2) Algorithm provider sends Coordinator DTA container Image to cloud service provider, containing the following embedded within itself:

(3) Video Segment DTA container Image (4) Motion Detector DTA container Image (5) Filter DTA container Image (6) Cloud service provider creates and starts Coordinator DTA container (from corresponding image).

(7) Coordinator DTA container creates and starts DTA containers for each of the DTA container images embedded within itself.

(8) Coordinator DTA container sends send-cap "Motion Detector DTA container" capability to Video Segment DTA container and send-cap "Filter DTA container" capability to Motion Detector DTA container.

(9) Coordinator DTA container sends sockets capability to Filter DTA container and Video Segment DTA container.

(10) Video Segment DTA container creates a message queue and sends mq-receive-from "Video Segment DTA container" capability to Motion Detector DTA container.

(11) Motion Detector DTA container opens message queue.

(12) Use the preceding two steps as a template to also establish a message queue from the Motion Detector DTA container to the Filter DTA container.

(13) Video Segment DTA container sends send-cap "Video Segment DTA container" capability to Motion Detector DTA container.

(14) Motion Detector DTA container sends send-cap "Motion Detector DTA container" capability to Filter DTA container.

(15) Filter DTA container sends query-DTA container "Filter DTA container" capability to Motion Detector DTA container.

(16) Motion Detector DTA container sends query-DTA container "Motion Detector DTA container" and query-DTA container "Filter DTA container" capabilities to Video Segment DTA container.

(17) Motion Detector DTA container freezes its capabilities.

(18) Video Segment DTA container queries Motion Detector DTA container and checks that it has frozen its capabilities and that it only has capabilities and message queues permitting it to send data to Filter DTA container.

(19) Video Segment DTA container queries Filter DTA container and checks the hash values for all of its DTA container images to verify that it is trustworthy.

(20) Video Segment DTA container opens a secure socket connection to a known host, records the fact that this video segment is being analyzed, and checks with the host that this video segment has never been analyzed in the past. This is to prevent iterative attacks that gradually leak out data about the video segment.

(21) Video Segment DTA container sends plaintext video segment data to Motion Detector DTA container.

(22) Motion Detector DTA container analyzes plaintext video and sends a Boolean indication of whether or not motion was detected to Filter DTA container.

(23) If motion was detected, Filter DTA container opens a secure socket connection to an agent of the home occupants and notifies it of the motion.

According to other embodiments, another mechanism for implementing AIFC is based on VMs instead of Docker™ containers. Analogous routines to those presented above for Docker™ may instead be implemented as hypercalls by a virtual machine monitor (VMM).

SGX Based

According to other embodiments, another mechanism for implementing AIFC is based on SGX attestation. SGX provides built-in support for local and remote attestation of software in enclaves. However, it does not provide direct support for limiting enclave-initiated flows of data out of an enclave. Hence, SGX does not directly support limiting the destinations to which data may be sent from a particular AIFC DTA. That support may be implemented by using software-based sandboxing techniques within the enclave. For example, MiniBox, as described in Li, Yanlin, et al. "MiniBox: A two-way sandbox for x86 native code," 2014 USENIX Annual Technical Conference, (2014), relies on Chromium NaCl to control the software within the enclave. In such a configuration, the relying DTA may check that the NaCl sandbox is in place and properly configured to control the possible destinations from the controlled DTA prior to releasing any sensitive data to it.

OS/Hypervisor Based

According to other embodiments, another mechanism is to use an OS or VMM to limit the outgoing communications from an enclave by configuring page tables or extended page tables to limit the memory destinations that may be written to by the enclave. For example, one enclave may be granted write access to a region and then another enclave may be granted read access to the region to permit an AIFC DTA in the first enclave to transfer data to an AIFC DTA in the second enclave. However, this introduces the OS or VMM into the TCB, so any DTA relying on the security of AIFC DTAs controlled in that way may also check an attestation of the OS or VMM in addition to the attestation of each relevant SGX DTA.

Figure 9:
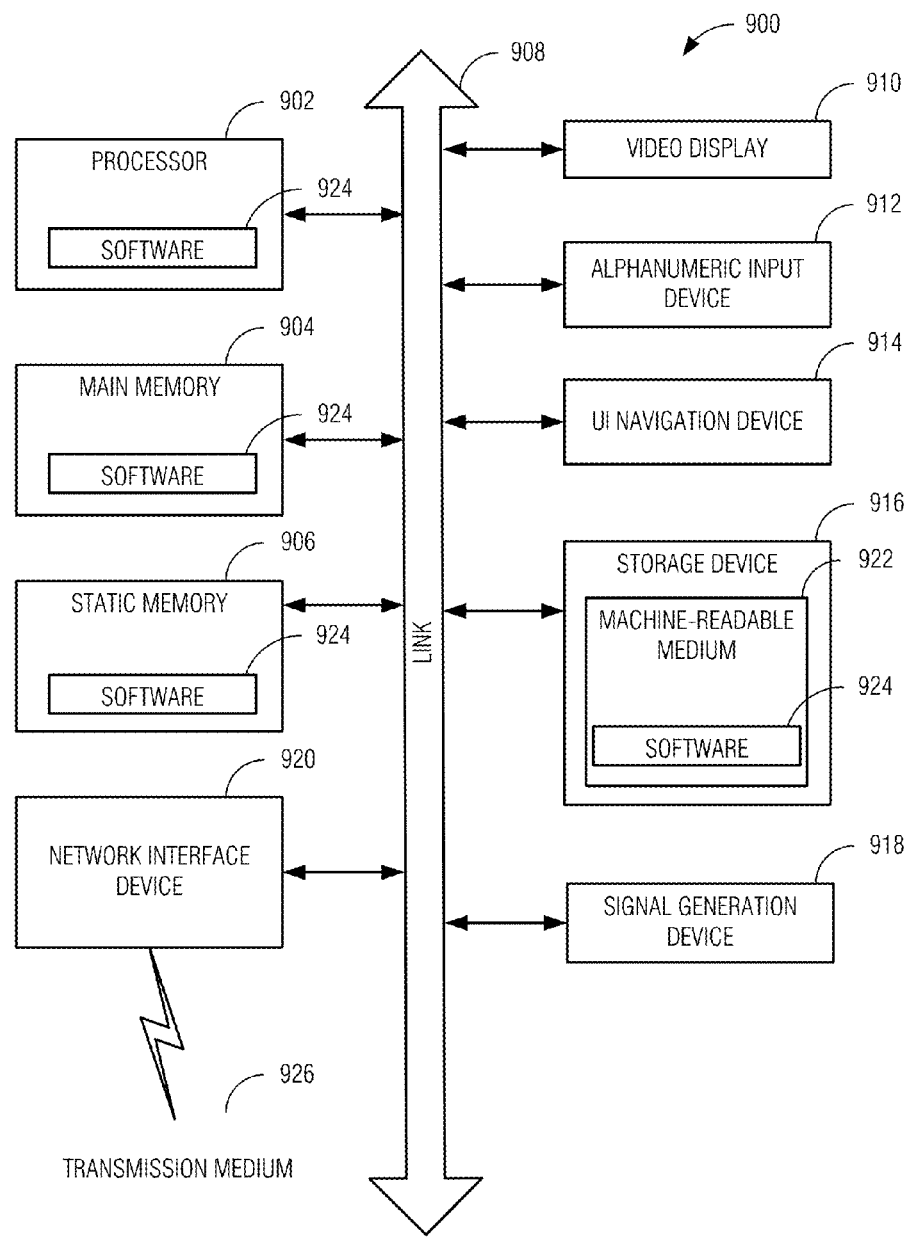
FIG. 9 is a block diagram illustrating a host machine in the example form of a general-purpose computer system.

FIG. 9 is a block diagram illustrating a host machine in the example form of a general-purpose computer system. In certain embodiments, programming of the computer system 900 according to one or more particular algorithms produces a special-purpose machine upon execution of that programming. In a networked deployment, the host machine may operate in the capacity of either a server or a client machine in server-client network environments, or it may act as a peer machine in peer-to-peer (or distributed) network environments. The host machine may take any suitable form factor, such as a personal computer (PC) workstation, a server, whether rack-mounted, or standalone, a mainframe computer, a cluster computing system, or the like, a set-top box, as well as a mobile or portable computing system, such as a laptop/notebook PC, an onboard vehicle system, wearable device, a tablet PC, a hybrid tablet, a personal digital assistant (PDA), a mobile telephone or, more generally, any machine capable of executing instructions (sequential or otherwise) that specify actions to be taken by that machine.

Example host machine 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The host machine 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The host machine 900 may additionally include a storage device 916 (e.g., a drive unit), a signal generation device 918 (e.g., a speaker), a network interface device (NID) 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the host machine 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 920 according to various embodiments may take any suitable form factor. In one such embodiment, NID 920 is in the form of a network interface card (NIC) that interfaces with processor 902 via link 908. In one example, link 908 includes a PCI Express (PCIe) bus, including a slot into which the NIC form-factor may removably engage. In another embodiment, NID 920 is a network interface circuit laid out on a motherboard together with local link circuitry, processor interface circuitry, other input/output circuitry, memory circuitry, storage device and peripheral controller circuitry, and the like. In another embodiment, NID 920 is a peripheral that interfaces with link 908 via a peripheral input/output port such as a universal serial bus (USB) port. NID 920 transmits and receives data over transmission medium 926, which may be wired or wireless (e.g., radio frequency, infra-red or visible light spectra, etc.), fiber optics, or the like.

Figure 10:
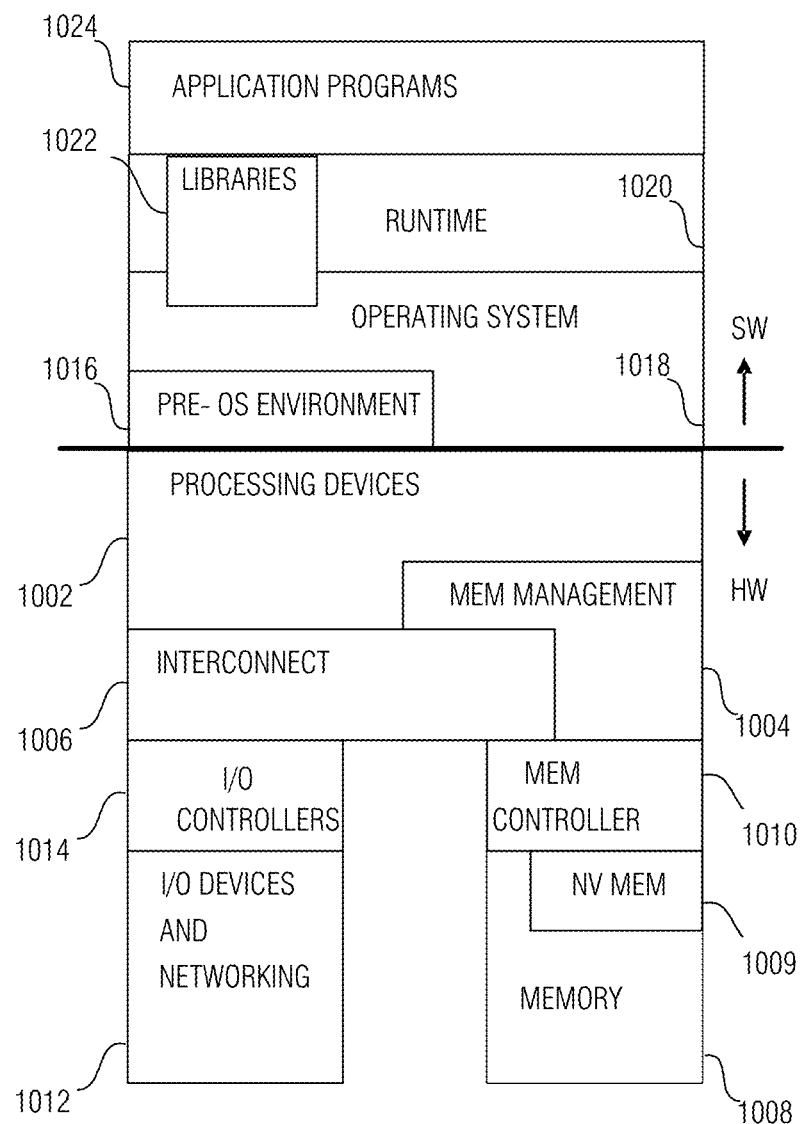
FIG. 10 is a diagram illustrating an exemplary hardware and software architecture of a computer system such as the one depicted in FIG. 9, in which various interfaces between hardware components and software components are shown.

FIG. 10 is a diagram illustrating an exemplary hardware and software architecture of a computer system such as the one depicted in FIG. 9, in which various interfaces between hardware components and software components are shown.

As indicated by HW, hardware components are represented below the divider line, whereas software components denoted by SW reside above the divider line. On the hardware side, processing devices 1002 (which may include one or more microprocessors, digital signal processors, etc., each having one or more processor cores, are interfaced with memory management device 1004 and system interconnect 1006. Memory management device 1004 provides mappings between virtual memory used by processes being executed, and the physical memory. Memory management device 1004 may be an integral part of a central processing unit which also includes the processing devices 1002.

Interconnect 1006 includes a backplane such as memory, data, and control lines, as well as the interface with input/output devices, e.g., PCI, USB, etc. Memory 1008 (e.g., dynamic random access memory—DRAM) and non-volatile memory 1009 such as flash memory (i.e., electrically-erasable read-only memory—EEPROM, NAND Flash, NOR Flash, etc.) are interfaced with memory management device 1004 and interconnect 1006 via memory controller 1010. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 1012, which interface with interconnect 1006 via corresponding I/O controllers 1014.

On the software side, a pre-operating system (pre-OS) environment 1016, which is executed at initial system start-up and is responsible for initiating the boot-up of the operating system. One traditional example of pre-OS environment 1016 is a system basic input/output system (BIOS). In present-day systems, a unified extensible firmware interface (UEFI) is implemented. Pre-OS environment 1016, described in greater detail below, is responsible for initiating the launching of the operating system, but also provides an execution environment for embedded applications according to certain aspects of the invention. Operating system 1018 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 1018 provides device drivers, and a variety of common services such as those that facilitate interfacing with peripherals and networking, that provide abstraction for application programs so that the applications do not need to be responsible for handling the details of such common operations. Operating system 1018 additionally provides a graphical user interface (GUI) that facilitates interaction with the user via peripheral devices such as a monitor, keyboard, mouse, microphone, video camera, touchscreen, and the like.

Runtime system 1020 implements portions of an execution model, including such operations as putting parameters onto the stack before a function call, the behavior of disk input/output (I/O), and parallel execution-related behaviors. Runtime system 1020 may also perform support services such as type checking, debugging, or code generation and optimization.

Libraries 1022 include collections of program functions that provide further abstraction for application programs. These include shared libraries, dynamic linked libraries (DLLs), for example. Libraries 1022 may be integral to the operating system 1018, runtime system 1020, or may be added-on features, or even remotely-hosted. Libraries 1022 define an application program interface (API) through which a variety of function calls may be made by application programs 1024 to invoke the services provided by the operating system 1018. Application programs 1024 are those programs that perform useful tasks for users, beyond the tasks performed by lower-level system programs that coordinate the basis operability of the computer system itself.

Additional Notes & Examples

Example 1 is a system for controlling data exposure among computing entities, comprising: computing hardware, including a processor coupled to a data store and input/output facilities, the computing hardware being constructed and operably configurable to execute a data transfer agent (DTA) module that includes: a data payload portion to store information content conditionally transferable to at least one other DTA module; and a code portion containing instructions that, when executed on the computing hardware, implement: a DTA connectivity link to the at least one other DTA module; an attestation module to obtain, via the DTA connectivity link, attestation from each of the at least one other DTA module indicating a data output connectivity configuration of that other DTA module; and a decision module to determine a degree of permissible interaction with each of the at least one other DTA module based the attestation and on decision criteria In Example 2, the subject matter of Example 1 optionally includes, wherein the DTA module is instantiated on a first computing entity, and the at least one other DTA module is instantiated on a second computing entity distinct from the first computing entity.

In Example 3, the subject matter of any one or more of Examples 1-2 optionally include, wherein the data payload portion is configured to securely store the information content in a manner that prevents unauthorized access by any entity external to the DTA module.

In Example 4, the subject matter of any one or more of Examples 1-3 optionally include, wherein the computing hardware stores an image of the DTA module wherein the instructions of the code portion are not executed.

In Example 5, the subject matter of any one or more of Examples 1-4 optionally include, wherein the computing hardware is part of a first computing entity, and wherein the computing hardware is configured to transmit an image of the DTA module wherein the instructions of the code portion are not executed, to a second computing entity.

In Example 6, the subject matter of any one or more of Examples 1-5 optionally include, wherein the attestation from each of the at least one other DTA module indicates a fixed data output connectivity configuration of that other DTA module.

In Example 7, the subject matter of any one or more of Examples 1-6 optionally include, wherein the attestation from each of the at least one other DTA module indicates data output connectivity configuration of one or more additional DTA modules that have input connectivity with an output of the at least one other DTA module.

In Example 8, the subject matter of any one or more of Examples 1-7 optionally include, wherein the permissible interaction with each of the at least one other DTA module includes transfer of at least a portion of the information content to the at least one other DTA module.

In Example 9, the subject matter of any one or more of Examples 1-8 optionally include, wherein the code portion further contains instructions that, when executed on the computing hardware, implement: a DTA instruction module operative to send instructions to the at least one other DTA module to establish connections to one or more additional DTA modules.

In Example 10, the subject matter of any one or more of Examples 1-9 optionally include, wherein the code portion further contains instructions that, when executed on the computing hardware, implement: a DTA instruction module operative to send instructions to the at least one other DTA to carry out a specific operation on behalf of the DTA module.

In Example 11, the subject matter of any one or more of Examples 1-10 optionally include, wherein the code portion further contains instructions that, when executed on the computing hardware, implement: a data processing module operative to perform data processing of the information content and output a result of the data processing to an entity external to the DTA module via the input/output facilities.

In Example 12, the subject matter of any one or more of Examples 1-11 optionally include, wherein the code portion further contains instructions that, when executed on the computing hardware, implement: an attestation response module operative to supply, to an attestation-requesting DTA module, an attestation indicating a data output connectivity configuration of the DTA module.

In Example 13, the subject matter of any one or more of Examples 1-12 optionally include, wherein the DTA module further includes: a properties portion to store a unique identifier of the DTA module, and a condition for formation of data transfer links between the at least one other DTA module.

In Example 14, the subject matter of any one or more of Examples 1-13 optionally include, wherein the computing hardware is operably configurable to execute an attestable information flow control (AIFC) platform that manages execution of the DTA module on the computing hardware.

In Example 15, the subject matter of any one or more of Examples 1-14 optionally include, wherein the computing hardware is operably configurable to execute a local portion of an attestable information flow control (AIFC) fabric that manages execution of the DTA module on the computing hardware, and on computing hardware of a remote computer system communicatively coupled to the computing hardware via the input/output facilities.

In Example 16, the subject matter of any one or more of Examples 1-15 optionally include, wherein the code portion further contains instructions that, when executed on the computing hardware, implement: a data input interface module operative to obtain data from a data source and store that data in the data payload portion.

In Example 17, the subject matter of any one or more of Examples 1-16 optionally include, wherein the code portion further contains instructions that, when executed on the computing hardware, implement: a data output interface module operative to transfer the data content from the data payload portion to a data destination that is external to the DTA module.

Example 18 is a system for controlling data exposure among computing entities, comprising: computing hardware, including a processor coupled to a data store and input/output facilities, the computing hardware being constructed and operably configurable to execute a data transfer agent (DTA) module that includes: a data payload portion to store information content; and a code portion containing instructions that, when executed on the computing hardware, implement: a DTA connectivity link to at least one other DTA module; an attestation response module operative to supply, to an attestation-requesting DTA module, an attestation indicating a data output connectivity configuration of the DTA module and, in response to an attestation request, to prevent creation of new data output connectivity links In Example 19, the subject matter of Example 18 optionally includes, wherein the DTA module is instantiated on a first computing entity, and the at least one other DTA module is instantiated on a second computing entity distinct from the first computing entity.

In Example 20, the subject matter of any one or more of Examples 18-19 optionally include, wherein the data payload portion is configured to securely store the information content in a manner that prevents unauthorized access by any entity external to the DTA module.

In Example 21, the subject matter of any one or more of Examples 18-20 optionally include, wherein the computing hardware stores an image of the DTA module wherein the instructions of the code portion are not executed.

In Example 22, the subject matter of any one or more of Examples 18-21 optionally include, wherein the computing hardware is part of a first computing entity, and wherein the computing hardware is configured to transmit an image of the DTA module wherein the instructions of the code portion are not executed, to a second computing entity.

In Example 23, the subject matter of any one or more of Examples 18-22 optionally include, wherein the attestation to the at least one other DTA module indicates data output connectivity configuration of one or more additional DTA modules that have input connectivity with an output of the DTA module.

In Example 24, the subject matter of any one or more of Examples 18-23 optionally include, wherein the code portion further contains instructions that, when executed on the computing hardware, implement: a DTA instruction module operative to receive instructions from the at least one other DTA module to establish connections to one or more additional DTA modules.

In Example 25, the subject matter of any one or more of Examples 18-24 optionally include, wherein the code portion further contains instructions that, when executed on the computing hardware, implement: a DTA instruction module operative to receive instructions from the at least one other DTA to carry out a specific operation on behalf of the at least one other DTA module.

In Example 26, the subject matter of any one or more of Examples 18-25 optionally include, wherein the code portion further contains instructions that, when executed on the computing hardware, implement: a data processing module operative to perform data processing of the information content and output a result of the data processing to an entity external to the DTA module via the input/output facilities.

In Example 27, the subject matter of any one or more of Examples 18-26 optionally include, wherein the DTA module further includes: a properties portion to store a unique identifier of the DTA module, and a condition for formation of data transfer links between the at least one other DTA module.

In Example 28, the subject matter of any one or more of Examples 18-27 optionally include, wherein the computing hardware is operably configurable to execute an attestable information flow control (AIFC) platform that manages execution of the DTA module on the computing hardware.

In Example 29, the subject matter of any one or more of Examples 18-28 optionally include, wherein the computing hardware is operably configurable to execute a local portion of an attestable information flow control (AIFC) fabric that manages execution of the DTA module on the computing hardware, and on computing hardware of a remote computer system communicatively coupled to the computing hardware via the input/output facilities.

In Example 30, the subject matter of any one or more of Examples 18-29 optionally include, wherein the code portion further contains instructions that, when executed on the computing hardware, implement: a data input interface module operative to obtain data from a data source and store that data in the data payload portion.

In Example 31, the subject matter of any one or more of Examples 18-30 optionally include, wherein the code portion further contains instructions that, when executed on the computing hardware, implement: a data output interface module operative to transfer the data content from the data payload portion to a data destination that is external to the DTA module.

Example 32 is at least one computer-readable medium comprising instructions for controlling data exposure among computing entities that, when executed on computing hardware, cause the computing hardware to implement: a data transfer agent (DTA) module that includes a data payload portion to store information content conditionally transferable to at least one other DTA module, and a code portion to implement: a DTA connectivity link to the at least one other DTA module; an attestation module to obtain, via the DTA connectivity link, attestation from each of the at least one other DTA module indicating a data output connectivity configuration of that other DTA module; and a decision module to determine a degree of permissible interaction with each of the at least one other DTA module based the attestation and on decision criteria In Example 33, the subject matter of Example 32 optionally includes, wherein the data payload portion is configured to securely store the information content in a manner that prevents unauthorized access by any entity external to the DTA module.

In Example 34, the subject matter of any one or more of Examples 32-33 optionally include, wherein the instructions, when executed, cause the computing hardware to store an image of the DTA module wherein the instructions of the code portion are not executed.

In Example 35, the subject matter of any one or more of Examples 32-34 optionally include, wherein the attestation from each of the at least one other DTA module indicates a fixed data output connectivity configuration of that other DTA module.

In Example 36, the subject matter of any one or more of Examples 32-35 optionally include, wherein the attestation from each of the at least one other DTA module indicates data output connectivity configuration of one or more additional DTA modules that have input connectivity with an output of the at least one other DTA module.

In Example 37, the subject matter of any one or more of Examples 32-36 optionally include, wherein the permissible interaction with each of the at least one other DTA module includes transfer of at least a portion of the information content to the at least one other DTA module.

In Example 38, the subject matter of any one or more of Examples 32-37 optionally include, wherein the code portion is to further implement: a DTA instruction module operative to send instructions to the at least one other DTA module to establish connections to one or more additional DTA modules.

In Example 39, the subject matter of any one or more of Examples 32-38 optionally include, wherein the code portion is to further implement: a DTA instruction module operative to send instructions to the at least one other DTA to carry out a specific operation on behalf of the DTA module.

In Example 40, the subject matter of any one or more of Examples 32-39 optionally include, wherein the code portion is to further implement: a data processing module operative to perform data processing of the information content and output a result of the data processing to an entity external to the DTA module via the input/output facilities.

In Example 41, the subject matter of any one or more of Examples 32-40 optionally include, wherein the code portion is to further implement: an attestation response module operative to supply, to an attestation-requesting DTA module, an attestation indicating a data output connectivity configuration of the DTA module.

In Example 42, the subject matter of any one or more of Examples 32-41 optionally include, wherein the DTA module further includes: a properties portion to store a unique identifier of the DTA module, and a condition for formation of data transfer links between the at least one other DTA module.

In Example 43, the subject matter of any one or more of Examples 32-42 optionally include, wherein the instructions, when executed, cause the computing hardware to execute an attestable information flow control (AIFC) platform that manages execution of the DTA module on the computing hardware.

In Example 44, the subject matter of any one or more of Examples 32-43 optionally include, wherein the instructions, when executed, cause the computing hardware to execute a local portion of an attestable information flow control (AIFC) fabric that manages execution of the DTA module on the computing hardware, and on computing hardware of a remote computer system communicatively coupled to the computing hardware via the input/output facilities.

In Example 45, the subject matter of any one or more of Examples 32-44 optionally include, wherein the code portion is to further implement: a data input interface module operative to obtain data from a data source and store that data in the data payload portion.

In Example 46, the subject matter of any one or more of Examples 32-45 optionally include, wherein the code portion is to further implement: a data output interface module operative to transfer the data content from the data payload portion to a data destination that is external to the DTA module.

Example 47 is at least one computer-readable medium comprising instructions for controlling data exposure among computing entities that, when executed on computing hardware, cause the computing hardware to implement: a data transfer agent (DTA) module that includes a data payload portion to store information content conditionally transferable to at least one other DTA module, and a code portion to implement: a DTA connectivity link to at least one other DTA module; and an attestation response module operative to supply, to an attestation-requesting DTA module, an attestation indicating a data output connectivity configuration of the DTA module and, in response to an attestation request, to prevent creation of new data output connectivity links In Example 48, the subject matter of Example 47 optionally includes, wherein the data payload portion is configured to securely store the information content in a manner that prevents unauthorized access by any entity external to the DTA module.

In Example 49, the subject matter of any one or more of Examples 47-48 optionally include, wherein the instructions, when executed, cause the computing hardware to store an image of the DTA module wherein the instructions of the code portion are not executed.

In Example 50, the subject matter of any one or more of Examples 47-49 optionally include, wherein the attestation to the at least one other DTA module indicates data output connectivity configuration of one or more additional DTA modules that have input connectivity with an output of the DTA module.

In Example 51, the subject matter of any one or more of Examples 47-50 optionally include, wherein the code portion is to further implement: a DTA instruction module operative to receive instructions from the at least one other DTA module to establish connections to one or more additional DTA modules.

In Example 52, the subject matter of any one or more of Examples 47-51 optionally include, wherein the code portion is to further implement: a DTA instruction module operative to receive instructions from the at least one other DTA to carry out a specific operation on behalf of the at least one other DTA module.

In Example 53, the subject matter of any one or more of Examples 47-52 optionally include, wherein the code portion is to further implement: a data processing module operative to perform data processing of the information content and output a result of the data processing to an entity external to the DTA module via the input/output facilities.

In Example 54, the subject matter of any one or more of Examples 47-53 optionally include, wherein the DTA module further includes: a properties portion to store a unique identifier of the DTA module, and a condition for formation of data transfer links between the at least one other DTA module.

In Example 55, the subject matter of any one or more of Examples 47-54 optionally include, wherein the instructions, when executed, cause the computing hardware to execute an attestable information flow control (AIFC) platform that manages execution of the DTA module on the computing hardware.

In Example 56, the subject matter of any one or more of Examples 47-55 optionally include, wherein the instructions, when executed, cause the computing hardware to execute a local portion of an attestable information flow control (AIFC) fabric that manages execution of the DTA module on the computing hardware, and on computing hardware of a remote computer system communicatively coupled to the computing hardware via the input/output facilities.

In Example 57, the subject matter of any one or more of Examples 47-56 optionally include, wherein the code portion is to further implement: a data input interface module operative to obtain data from a data source and store that data in the data payload portion.

In Example 58, the subject matter of any one or more of Examples 47-57 optionally include, wherein the code portion is to further implement: a data output interface module operative to transfer the data content from the data payload portion to a data destination that is external to the DTA module.

Example 59 is a method for controlling data exposure among computing entities, the method comprising: executing, on computing hardware, a data transfer agent (DTA) module that includes a data payload portion to store information content conditionally transferable to at least one other DTA module, and a code portion to implement: a DTA connectivity link to the at least one other DTA module; an attestation module to obtain, via the DTA connectivity link, attestation from each of the at least one other DTA module indicating a data output connectivity configuration of that other DTA module; and a decision module to determine a degree of permissible interaction with each of the at least one other DTA module based the attestation and on decision criteria In Example 60, the subject matter of Example 59 optionally includes, wherein the data payload portion is configured to securely store the information content in a manner that prevents unauthorized access by any entity external to the DTA module.

In Example 61, the subject matter of any one or more of Examples 59-60 optionally include, further comprising: storing an image of the DTA module wherein the code portion is not executed.

In Example 62, the subject matter of any one or more of Examples 59-61 optionally include, wherein the attestation from each of the at least one other DTA module indicates a fixed data output connectivity configuration of that other DTA module.

In Example 63, the subject matter of any one or more of Examples 59-62 optionally include, wherein the attestation from each of the at least one other DTA module indicates data output connectivity configuration of one or more additional DTA modules that have input connectivity with an output of the at least one other DTA module.

In Example 64, the subject matter of any one or more of Examples 59-63 optionally include, wherein the permissible interaction with each of the at least one other DTA module includes transfer of at least a portion of the information content to the at least one other DTA module.

In Example 65, the subject matter of any one or more of Examples 59-64 optionally include, wherein the code portion is to further implement: a DTA instruction module operative to send instructions to the at least one other DTA module to establish connections to one or more additional DTA modules.

In Example 66, the subject matter of any one or more of Examples 59-65 optionally include, wherein the code portion is to further implement: a DTA instruction module operative to send instructions to the at least one other DTA to carry out a specific operation on behalf of the DTA module.

In Example 67, the subject matter of any one or more of Examples 59-66 optionally include, wherein the code portion is to further implement: a data processing module operative to perform data processing of the information content and output a result of the data processing to an entity external to the DTA module via the input/output facilities.

In Example 68, the subject matter of any one or more of Examples 59-67 optionally include, wherein the code portion is to further implement: an attestation response module operative to supply, to an attestation-requesting DTA module, an attestation indicating a data output connectivity configuration of the DTA module.

In Example 69, the subject matter of any one or more of Examples 59-68 optionally include, wherein the DTA module further includes: a properties portion to store a unique identifier of the DTA module, and a condition for formation of data transfer links between the at least one other DTA module.

In Example 70, the subject matter of any one or more of Examples 59-69 optionally include, further comprising:

executing, on the computing hardware, an attestable information flow control (AIFC) platform that manages execution of the DTA module.

In Example 71, the subject matter of any one or more of Examples 59-70 optionally include, further comprising: executing, on the computing hardware, local portion of an attestable information flow control (AIFC) fabric that manages execution of the DTA module on the computing hardware, and on computing hardware of a remote computer system communicatively coupled to the computing hardware via the input/output facilities.

In Example 72, the subject matter of any one or more of Examples 59-71 optionally include, wherein the code portion is to further implement: a data input interface module operative to obtain data from a data source and store that data in the data payload portion.

In Example 73, the subject matter of any one or more of Examples 59-72 optionally include, wherein the code portion is to further implement: a data output interface module operative to transfer the data content from the data payload portion to a data destination that is external to the DTA module.

Example 74 is a method for controlling data exposure among computing entities, the method comprising: executing, on computing hardware, a data transfer agent (DTA) module that includes a data payload portion to store information content conditionally transferable to at least one other DTA module, and a code portion to implement: a DTA connectivity link to at least one other DTA module; and an attestation response module operative to supply, to an attestation-requesting DTA module, an attestation indicating a data output connectivity configuration of the DTA module and, in response to an attestation request, to prevent creation of new data output connectivity links In Example 75, the subject matter of Example 74 optionally includes, wherein the data payload portion is configured to securely store the information content in a manner that prevents unauthorized access by any entity external to the DTA module.

In Example 76, the subject matter of any one or more of Examples 74-75 optionally include, further comprising: storing an image of the DTA module on the computing hardware wherein the instructions of the code portion are not executed.

In Example 77, the subject matter of any one or more of Examples 74-76 optionally include, wherein the attestation to the at least one other DTA module indicates data output connectivity configuration of one or more additional DTA modules that have input connectivity with an output of the DTA module.

In Example 78, the subject matter of any one or more of Examples 74-77 optionally include, wherein the code portion is to further implement: a DTA instruction module operative to receive instructions from the at least one other DTA module to establish connections to one or more additional DTA modules.

In Example 79, the subject matter of any one or more of Examples 74-78 optionally include, wherein the code portion is to further implement: a DTA instruction module operative to receive instructions from the at least one other DTA to carry out a specific operation on behalf of the at least one other DTA module.

In Example 80, the subject matter of any one or more of Examples 74-79 optionally include, wherein the code portion is to further implement: a data processing module operative to perform data processing of the information content and output a result of the data processing to an entity external to the DTA module via the input/output facilities.

In Example 81, the subject matter of any one or more of Examples 74-80 optionally include, wherein the DTA module further includes: a properties portion to store a unique identifier of the DTA module, and a condition for formation of data transfer links between the at least one other DTA module.

In Example 82, the subject matter of any one or more of Examples 74-81 optionally include, wherein the instructions, when executed, cause the computing hardware to execute an attestable information flow control (AIFC) platform that manages execution of the DTA module on the computing hardware.

In Example 83, the subject matter of any one or more of Examples 74-82 optionally include, further comprising: executing, on the computing hardware, a local portion of an attestable information flow control (AIFC) fabric that manages execution of the DTA module on the computing hardware, and on computing hardware of a remote computer system communicatively coupled to the computing hardware via the input/output facilities.

In Example 84, the subject matter of any one or more of Examples 74-83 optionally include, wherein the code portion is to further implement: a data input interface module operative to obtain data from a data source and store that data in the data payload portion.

In Example 85, the subject matter of any one or more of Examples 74-84 optionally include, wherein the code portion is to further implement: a data output interface module operative to transfer the data content from the data payload portion to a data destination that is external to the DTA module.

Example 86 is a system for controlling data exposure among computing entities that, the system comprising: means for executing, on computing hardware, a data transfer agent (DTA) module that includes a data payload portion to store information content conditionally transferable to at least one other DTA module, and processing means to implement: a DTA connectivity link to the at least one other DTA module; means for obtaining, via the DTA connectivity link, attestation from each of the at least one other DTA module indicating a data output connectivity configuration of that other DTA module; and means for determining a degree of permissible interaction with each of the at least one other DTA module based the attestation and on decision criteria In Example 87, the subject matter of Example 86 optionally includes, wherein the data payload portion is configured to securely store the information content in a manner that prevents unauthorized access by any entity external to the DTA module.

In Example 88, the subject matter of any one or more of Examples 86-87 optionally include, further comprising: means for storing an image of the DTA module wherein the processing means is not executed.

In Example 89, the subject matter of any one or more of Examples 86-88 optionally include, wherein the attestation from each of the at least one other DTA module indicates a fixed data output connectivity configuration of that other DTA module.

In Example 90, the subject matter of any one or more of Examples 86-89 optionally include, wherein the attestation from each of the at least one other DTA module indicates data output connectivity configuration of one or more additional DTA modules that have input connectivity with an output of the at least one other DTA module.

In Example 91, the subject matter of any one or more of Examples 86-90 optionally include, wherein the permissible interaction with each of the at least one other DTA module includes transfer of at least a portion of the information content to the at least one other DTA module.

In Example 92, the subject matter of any one or more of Examples 86-91 optionally include, wherein the processing means is to further implement: means for sending instructions to the at least one other DTA module to establish connections to one or more additional DTA modules.

In Example 93, the subject matter of any one or more of Examples 86-92 optionally include, wherein the processing means is to further implement: means for sending instructions to the at least one other DTA to carry out a specific operation on behalf of the DTA module.

In Example 94, the subject matter of any one or more of Examples 86-93 optionally include, wherein the processing means is to further implement: means for performing data processing of the information content and output a result of the data processing to an entity external to the DTA module via the input/output facilities.

In Example 95, the subject matter of any one or more of Examples 86-94 optionally include, wherein the processing means is to further implement: means for supplying, to an attestation-requesting DTA module, an attestation indicating a data output connectivity configuration of the DTA module.

In Example 96, the subject matter of any one or more of Examples 86-95 optionally include, wherein the DTA module further includes: means for storing a unique identifier of the DTA module, and a condition for formation of data transfer links between the at least one other DTA module.

In Example 97, the subject matter of any one or more of Examples 86-96 optionally include, further comprising: means for executing, on the computing hardware, an attestable information flow control (AIFC) platform that manages execution of the DTA module.

In Example 98, the subject matter of any one or more of Examples 86-97 optionally include, further comprising: means for executing, on the computing hardware, local portion of an attestable information flow control (AIFC) fabric that manages execution of the DTA module on the computing hardware, and on computing hardware of a remote computer system communicatively coupled to the computing hardware via the input/output facilities.

In Example 99, the subject matter of any one or more of Examples 86-98 optionally include, wherein the processing means is to further implement: means for obtaining data from a data source and store that data in the data payload portion.

In Example 100, the subject matter of any one or more of Examples 86-99 optionally include, wherein the processing means is to further implement: means for transferring the data content from the data payload portion to a data destination that is external to the DTA module.

Example 101 is a system for controlling data exposure among computing entities, the system comprising: means for executing, on a computing system, a data transfer agent (DTA) module that includes a data payload portion to store information content conditionally transferable to at least one other DTA module, and processing means to implement: a DTA connectivity link to at least one other DTA module; and means for supplying, to an attestation-requesting DTA module, an attestation indicating a data output connectivity configuration of the DTA module and, in response to an attestation request, preventing creation of new data output connectivity links In Example 102, the subject matter of Example 101 optionally includes, wherein the data payload portion is configured to securely store the information content in a manner that prevents unauthorized access by any entity external to the DTA module.

In Example 103, the subject matter of any one or more of Examples 101-102 optionally include, further comprising: means for storing an image of the DTA module on the computing hardware wherein the instructions of the processing means are not executed.

In Example 104, the subject matter of any one or more of Examples 101-103 optionally include, wherein the attestation to the at least one other DTA module indicates data output connectivity configuration of one or more additional DTA modules that have input connectivity with an output of the DTA module.

In Example 105, the subject matter of any one or more of Examples 101-104 optionally include, wherein the processing means is to further implement: means for receiving instructions from the at least one other DTA module to establish connections to one or more additional DTA modules.

In Example 106, the subject matter of any one or more of Examples 101-105 optionally include, wherein the processing means is to further implement: means for receiving instructions from the at least one other DTA to carry-out a specific operation on behalf of the at least one other DTA module.

In Example 107, the subject matter of any one or more of Examples 101-106 optionally include, wherein the processing means is to further implement: means for performing data processing of the information content and output a result of the data processing to an entity external to the DTA module via the input/output facilities.

In Example 108, the subject matter of any one or more of Examples 101-107 optionally include, wherein the DTA module further includes: means for storing a unique identifier of the DTA module, and a condition for formation of data transfer links between the at least one other DTA module.

In Example 109, the subject matter of any one or more of Examples 101-108 optionally include, further comprising: means for executing an attestable information flow control (AIFC) platform that manages execution of the DTA module on the computing hardware.

In Example 110, the subject matter of any one or more of Examples 101-109 optionally include, further comprising: means for executing, on the computing hardware, a local portion of an attestable information flow control (AIFC) fabric that manages execution of the DTA module on the computing hardware, and on computing hardware of a remote computer system communicatively coupled to the computing hardware via the input/output facilities.

In Example 111, the subject matter of any one or more of Examples 101-110 optionally include, wherein the processing means is to further implement: means for obtaining data from a data source and store that data in the data payload portion.

In Example 112, the subject matter of any one or more of Examples 101-111 optionally include, wherein the processing means is to further implement: means for transferring the data content from the data payload portion to a data destination that is external to the DTA module.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for controlling data exposure among computing entities, comprising:
   computing hardware, including a processor coupled to a data store and input/output facilities, the computing hardware being constructed and operably configurable to execute a data transfer agent (DTA) module that includes:
   a data payload portion to store information content conditionally transferable to at least one other DTA module; and
   a code portion containing instructions that, when executed on the computing hardware, implement:
      a DTA connectivity link to the at least one other DTA module;
      an attestation module to obtain, via the DTA connectivity link, attestation from each of the at least one other DTA module indicating a data output connectivity configuration of that other DTA module; and
      a decision module to determine a degree of permissible interaction with each of the at least one other DTA module based the attestation and on decision criteria.

2. The system of claim 1, wherein the computing hardware is part of a first computing entity, and wherein the computing hardware is configured to transmit an image of the DTA module wherein the instructions of the code portion are not executed, to a second computing entity.

3. The system of claim 1, wherein the attestation from each of the at least one other DTA module indicates a fixed data output connectivity configuration of that other DTA module.

4. The system of claim 1, wherein the attestation from each of the at least one other DTA module indicates data output connectivity configuration of one or more additional DTA modules that have input connectivity with an output of the at least one other DTA module.

5. The system of claim 1, wherein the code portion further contains instructions that, when executed on the computing hardware, implement:
   a DTA instruction module operative to send instructions to the at least one other DTA to carry out a specific operation on behalf of the DTA module.

6. The system of claim 1, wherein the code portion further contains instructions that, when executed on the computing hardware, implement:
   a data processing module operative to perform data processing of the information content and output a result of the data processing to an entity external to the DTA module via the input/output facilities.

7. The system of claim 1, wherein the code portion further contains instructions that, when executed on the computing hardware, implement:
   an attestation response module operative to supply, to an attestation-requesting DTA module, an attestation indicating a data output connectivity configuration of the DTA module.

8. The system of claim 1, wherein the computing hardware is operably configurable to execute an attestable information flow control (AIFC) platform that manages execution of the DTA module on the computing hardware.

9. The system of claim 1, wherein the computing hardware is operably configurable to execute a local portion of an attestable information flow control (AIFC) fabric that manages execution of the DTA module on the computing hardware, and on computing hardware of a remote computer system communicatively coupled to the computing hardware via the input/output facilities.

10. The system of claim 1, wherein the code portion further contains instructions that, when executed on the computing hardware, implement:
    a data input interface module operative to obtain data from a data source and store that data in the data payload portion.

11. The system of claim 1, wherein the code portion further contains instructions that, when executed on the computing hardware, implement:

a data output interface module operative to transfer the data content from the data payload portion to a data destination that is external to the DTA module.

12. A system for controlling data exposure among computing entities, comprising:
   computing hardware, including a processor coupled to a data store and input/output facilities, the computing hardware being constructed and operably configurable to execute a data transfer agent (DTA) module that includes:
   a data payload portion to store information content; and
   a code portion containing instructions that, when executed on the computing hardware, implement:
   a DTA connectivity link to at least one other DTA module;
   an attestation response module operative to supply, to an attestation-requesting DTA module, an attestation indicating a data output connectivity configuration of the DTA module and, in response to an attestation request, to prevent creation of new data output connectivity links.

13. The system of claim 12, wherein the attestation to the at least one other DTA module indicates data output connectivity configuration of one or more additional DTA modules that have input connectivity with an output of the DTA module.

14. The system of claim 12, wherein the code portion further contains instructions that, when executed on the computing hardware, implement:
   a DTA instruction module operative to receive instructions from the at least one other DTA module to establish connections to one or more additional DTA modules.

15. The system of claim 12, wherein the code portion further contains instructions that, when executed on the computing hardware, implement:
   a data input interface module operative to obtain data from a data source and store that data in the data payload portion.

16. The system of claim 12, wherein the code portion further contains instructions that, when executed on the computing hardware, implement:
   a data output interface module operative to transfer the data content from the data payload portion to a data destination that is external to the DTA module.

17. At least one non-transitory computer-readable storage medium comprising instructions for controlling data exposure among computing entities that, when executed on computing hardware, cause the computing hardware to implement:
   a data transfer agent (DTA) module that includes a data payload portion to store information content conditionally transferable to at least one other DTA module, and a code portion to implement:
   a DTA connectivity link to the at least one other DTA module;
   an attestation module to obtain, via the DTA connectivity link, attestation from each of the at least one other DTA module indicating a data output connectivity configuration of that other DTA module; and
   a decision module to determine a degree of permissible interaction with each of the at least one other DTA module based the attestation and on decision criteria.

18. The at least one computer-readable medium of claim 17, wherein the data payload portion is configured to securely store the information content in a manner that prevents unauthorized access by any entity external to the DTA module.

19. The at least one computer-readable medium of claim 17, wherein the attestation from each of the at least one other DTA module indicates data output connectivity configuration of one or more additional DTA modules that have input connectivity with an output of the at least one other DTA module.

20. The at least one computer-readable medium of claim 17, wherein the code portion is to further implement:
   a DTA instruction module operative to send instructions to the at least one other DTA module to establish connections to one or more additional DTA modules.

21. The at least one computer-readable medium of claim 17, wherein the code portion is to further implement:
   a DTA instruction module operative to send instructions to the at least one other DTA to carry out a specific operation on behalf of the DTA module.

22. The at least one computer-readable medium of claim 17, wherein the code portion is to further implement:
   an attestation response module operative to supply, to an attestation-requesting DTA module, an attestation indicating a data output connectivity configuration of the DTA module.

23. The at least one computer-readable medium of claim 17, wherein the DTA module further includes:
   a properties portion to store a unique identifier of the DTA module, and a condition for formation of data transfer links between the at least one other DTA module.

24. A method for controlling data exposure among computing entities, the method comprising:
   executing, on computing hardware, a data transfer agent (DTA) module that includes a data payload portion to store information content conditionally transferable to at least one other DTA module, and a code portion to implement:
   a DTA connectivity link to at least one other DTA module; and
   an attestation response module operative to supply, to an attestation-requesting DTA module, an attestation indicating a data output connectivity configuration of the DTA module and, in response to an attestation request, to prevent creation of new data output connectivity links.

25. The method of claim 24, wherein the code portion is to further implement:
   a DTA instruction module operative to receive instructions from the at least one other DTA to carry out a specific operation on behalf of the at least one other DTA module.

* * * * *